United States Patent [19]
Hehl

[11] Patent Number: 5,253,998
[45] Date of Patent: Oct. 19, 1993

[54] PLASTICIZING ASSEMBLY FOR USE IN AN INJECTION MOLDING MACHINE

[76] Inventor: Karl Hehl, Arthur-Hehl-Str. 32, D-7298 Lossburg 1, Fed. Rep. of Germany

[21] Appl. No.: 800,068

[22] Filed: Nov. 29, 1991

[30] Foreign Application Priority Data

Feb. 23, 1991 [DE] Fed. Rep. of Germany ....... 4105731

[51] Int. Cl.$^5$ .............................................. B29C 45/23
[52] U.S. Cl. ..................................... 425/562; 425/564
[58] Field of Search ............... 425/185, 190, 562, 563, 425/564, 566

[56] References Cited

U.S. PATENT DOCUMENTS

| | | | |
|---|---|---|---|
| 4,863,362 | 9/1989 | Hehl | 425/190 |
| 4,886,439 | 12/1989 | Hehl | 425/190 |

Primary Examiner—Tim Heitbrink
Attorney, Agent, or Firm—Spencer, Frank & Schneider

[57] ABSTRACT

The strokes performed in the direction of the injection axis by a valve-actuating cylinder disposed near the rear portion of the plasticizing cylinder are transformed by a motion-deflecting lever into opening and closing movements of the valve needle. The motion-deflecting lever is disposed within the protective skeleton, which surrounds the plasticizing cylinder. The lever is pivoted to the skeleton by a supporting pivot assembly. The valve needle extends rearwardly to a location which is radially aligned with the feed screw when it is in its foremost position. The valve needle extends in a needle-guiding bore, which is formed in the plasticizing cylinder and has a relatively wide rear portion having an open rear end at a location which is radially aligned with the back flow valve when the feed screw is in its foremost position. Owing to that design the assembly by which movement is effected by the valve-actuating cylinder in the direction of the injection axis and transmitted to the valve needle, which is inclined relative to the injection axis, can be manufactured at much lower cost.

12 Claims, 7 Drawing Sheets

PLASTICIZING ASSEMBLY FOR USE IN AN INJECTION MOLDING MACHINE

BACKGROUND OF THE INVENTION

1. Field of the Invention

This invention relates to a plasticizing assembly for use in an injection molding machine, which plasticizing assembly comprises a plasticizing cylinder comprising a nozzle section, a cylinder section, and clamping means holding said nozzle section and cylinder section together in axial alignment, also comprises heating means for plasticizing plastic material in said cylinder section, a feed screw, which is operable to rotate for feeding plastic material being plasticized in said cylinder section toward said nozzle section and to perform an axial stroke for injecting plasticized plastic material from said nozzle section, and a back flow valve for preventing a back flow of plastic material during said stroke, which plasticizing assembly also comprises a carrier block, in which said cylinder section is mounted near its rear end.

wherein a skeleton is provided, which surrounds said cylinder section between said carrier block and the location of the foremost position of said back flow valve and comprises skeleton elements for protecting and supporting said plasticizing cylinder, inclusive of said heating means, wherein said nozzle section is formed with a nozzle orifice for discharging said plasticized plastic material along a predetermined injection axis and with a needle-guiding bore, which communicates with said nozzle orifice and is inclined relative to said injection axis, and a valve needle for opening and closing said nozzle orifice is longitudinally slidably mounted in said bore, wherein said plasticizing assembly comprises a valve-actuating cylinder, which is disposed adjacent to said carrier block and operable in a direction that is parallel to said injection axis to displace said valve needle in said bore to open and close said nozzle orifice, and a force-transmitting linkage, which operatively connects said valve-actuating cylinder to said valve needle and comprises a rear link, which is parallel to said injection axis and connected to said valve-actuating cylinder, a forward link, which is parallel to said bore and connected to said valve needle, and a motion-deflecting lever, which on spaced apart axes is pivoted to a supporting structure and to said links and is arranged to transform a longitudinal movement imparted to said rear link by said actuating cylinder to a longitudinal movement of said forward link and said valve needle in the direction of said bore.

2. Description of the Prior Art

In a plasticizing assembly of that kind which is known from U.S. Pat. No. 4,886,439 the plasticizing cylinder is surrounded by a skeleton, which extends axially along an intermediate length portion of the plasticizing cylinder.

The basic structure of that skeleton has specifically been disclosed in FIG. 5 of U.S. Pat. No. 4,863,362 and its description and that disclosure is incorporated herein by reference.

In plasticizing assemblies of the kind described first hereinbefore the plasticizing cylinder is detachably mounted in a bore of the carrying block and the valve-actuating cylinder is disposed adjacent to the carrier block and adapted to be uncoupled from the force-transmitting linkage so that the valveactuating cylinder may be left in the injecting unit when the plasticizing cylinder is to be replaced. The motion-deflecting lever is pivoted to the nozzle section or to the cylinder section so that the motion-deflecting lever and its pivots will be subjected to extremely high temperatures during the injection molding operation and said lever and pivots must be made of heat-resisting castings having finished surfaces. Because the valve needle is rather short, the motion-deflecting lever and its pivots must be made with small manufacturing tolerances. For this reason the pivoting of the lever to the nozzle section or cylinder section involves relatively high manufacturing costs, particularly as regards the provision of pivot bearings for mounting the pivots of the motion-deflecting lever in the nozzle section or cylinder section.

In the known plasticizing cylinder the inclination of the needle-guiding bore relative to the injection axis is rather large, for various reasons, and amounts to about 30°. As a result, the intersection between the inclined bore and the axially extending nozzle orifice is relatively short so that the closing of the nozzle orifice will be facilitated. Besides, a large inclination is required in view of the adjacent clamping ring, the forward end of the cylinder section and the adjacent heating element. These adjacent parts would render the mounting of the valve needle in a bore haivng a smaller angle of inclination extremely difficult.

SUMMARY OF THE INVENTION

It is an object of the invention so to design a plasticizing assembly which is of the kind described first hereinbefore that the means for transforming the movement of the valve-actuating cylinder in a direction that is parallel to the injection axis to a movement of the valve needle at an acute angle to said axis can be manufactured at lower cost.

That object is accomplished in accordance with the invention in that the motion-deflecting lever is pivoted to said skeleton within the latter by supporting pivot means which with respect to said injection axis are radially spaced from said heating means, said valve needle extends laterally of said feed screw when it is in its foremost position, said needle-guiding bore has a relatively wide rear portion and a relatively narrow forward portion opening into said nozzle orifice, said rear portion has an open rear end at a location which is radially aligned with said back flow valve when said feed screw is in its foremost position, and said valve needle extends rearwardly from said open rear end to a location which is radially aligned with said feed screw when it is in its foremost position.

The supporting pivot means are so arranged within the skeleton that the radial distance between said supporting pivot means and said heating means is smaller than the radial distance between the skeleton elements supporting said supporting pivot means and said heating means so that mechanical actions from the outside will affect the skeleton but will not affect the motion-deflecting lever.

In the plasticizing assembly in accordance with the invention the motion-deflecting lever and its pivots are disposed outside the region which is strongly heated by the adjacent heating means and the motion-deflecting lever is virtually incorporated in the skeleton associated with the plasticizing cylinder so that the motion-deflecting lever and its pivots can be so designed that they can be manufactured at lower cost.

The motion-deflecting lever may be offset and just as its pivots may be made with relatively large manufacturing tolerances. For instance, the motion-deflecting lever may be composed of bent metal strips. It may preferably be pivoted to horizontal track bars of the skeleton, which bars are required in any case for supporting the plasticizing cylinder during its periodic axial movements.

To close and open the nozzle orifice, the pivots by which the rear and forward links of the force-transmitting linkage are pivoted to the motion-deflecting lever are constrained to move along an arc of a circle so that the forward link and the rear portion of the valve needle will then be subjected to a bending stress. But that bending stresses can be minimized if the motion-deflecting lever is spaced a large distance from the nozzle orifice.

Finally, the valve needle and the forward link are accommodated in the body of the plasticizing cylinder and in the skeleton to such a large extent that damage to the valve needle and the forward link will virtually be precluded.

In a preferred embodiment the angle between the needle-guiding bore and the injection axis is less than 25°, the valve needle extends through a clamping ring, which is included in the clamping means and disposed at the parting line between the nozzle section and the cylinder section, and the rear end of the relatively wide rear portion of the needle-guiding bore is disposed adjacent to the sealing plane defined by said back flow valve in said plasticizing cylinder. Behind the needle-guiding bore the valve needle may extend in recesses, which are formed in heating elements, which consist of cast shell sections, and said recesses may constitute a passage which adjoins said rear portion of the needle-guiding bore. In such an embodiment the inclination of the valve needle may be very small because the valve needle extends through the clamping ring of the clamping means and the rear end of the needle-guiding bore is formed in the cylinder section adjacent to the sealing plane of the back flow valve and behind said rear end of the bore the valve needle extends in recesses of a cast heating element.

In a preferred embodiment the skeleton comprises flat vertical skeleton elements formed with circular apertures, through which the cylinder section extends, said flat skeleton elements are provided with flanges, to which track bars are secured, which are included in the skeleton and are disposed in a horizontal plane which includes the injection axis, the supporting pivot means of the motion-deflecting lever are supported on the inside of said track bars and the motion-deflecting lever is pivoted to the forward link by a pivot disposed in a plane which is approximately at right angles to the forward link. That embodiment permits the skeleton to be manufactured at particularly low cost and ensures that the bending stresses in the forward link and the valve needle will be minimized.

In a preferred embodiment the skeleton comprises a protective shell, which surrounds and is secured to internal skeleton elements and surrounds also the motion-deflecting lever, which is made from two sheet metal blanks, and the forward link of the force-transmitting linkage. In that embodiment any damage to the valve needle, the forward link and the motion-deflecting lever by external force actions, particularly during a replacement of the plasticizing cylinder and its transportation to and from storage, are almost precluded. This is of special significance for injection molding machines used in countries which are not highly industrially developed.

In a preferred embodiment the forward link of the linkage consists of a rod and a tapped sleeve, by which the rod is joined to the valve needle, each of the sections of the motion-deflecting lever which have been made from sheet metal blanks has a vertical top portion, a horizontal intermediate portion and a forwardly inclined vertical bottom portion, the rear link is pivoted to the top end of the bottom portions and the forward link is pivoted to the bottom end of the bottom portions. That embodiment permits a manufacture of the forward link and of the motion-deflecting lever at particularly low cost.

In a preferred embodiment, the cylinder section consists of forward and rear cylindrical subsections and a tapped sleeve connecting said subsections, the parting line between said subsections is axially spaced from the protective shell by a distance which equals the distance of the parting line between the nozzle section and the cylinder section in an assembly in which the cylinder section is integral, and each of the forward link of the linkage and the feed screw has a length which is sufficient in view of the provision of the forward subsection. The distance from the supporting pivot means to the nozzle orifice may be approximately one-third of the total length of the plasticizing cylinder if the plasticizing cylinder is integral and may be increased by the length of the forward subsection of a two-part plasticizing cylinder. In that case the plasticizing cylinder has a much larger length and can be converted with a very small amount of work to a plasticizing cylinder having a normal length. As a result, a plasticizing assembly for both alternatives can be provided at very low manufacturing costs because it is sufficient in manufacture and storage to provide in addition to the standard parts only a forward subsection for the cylinder section, a longer rod as the forward link of the linkage, and a longer feed screw. The connecting portions at the forward and rear ends of the forward subsection and of the longer rod correspond to the adjacent connecting portions of the nozzle section and of the normal-length cylinder section and of the normal-length rod.

In a preferred embodiment the cylinder section has a forward portion which is enlarged in inside diameter and surrounds the nozzle section in part of its length and the nozzle section extends rearwardly to a location which is radially aligned with the forward end of the feed screw when it is in its rearmost position. In that case the rear end of the nozzle section is disposed in the cylinder section at a location which when the feed screw is in its rearmost position is disposed behind the sealing plane of the back flow valve, i.e., in a region which is under a relatively low pressure, whereas that space which is disposed in front of the sealing plane and will be subjected to extremely high pressures during the injection stroke is completely surrounded by the nozzle section.

DETAILED DESCRIPTION OF THE PREFERRED EMBODIMENTS

Illustrative embodiments of the invention will now be described more in detail with reference to the drawings.

Figure 1:
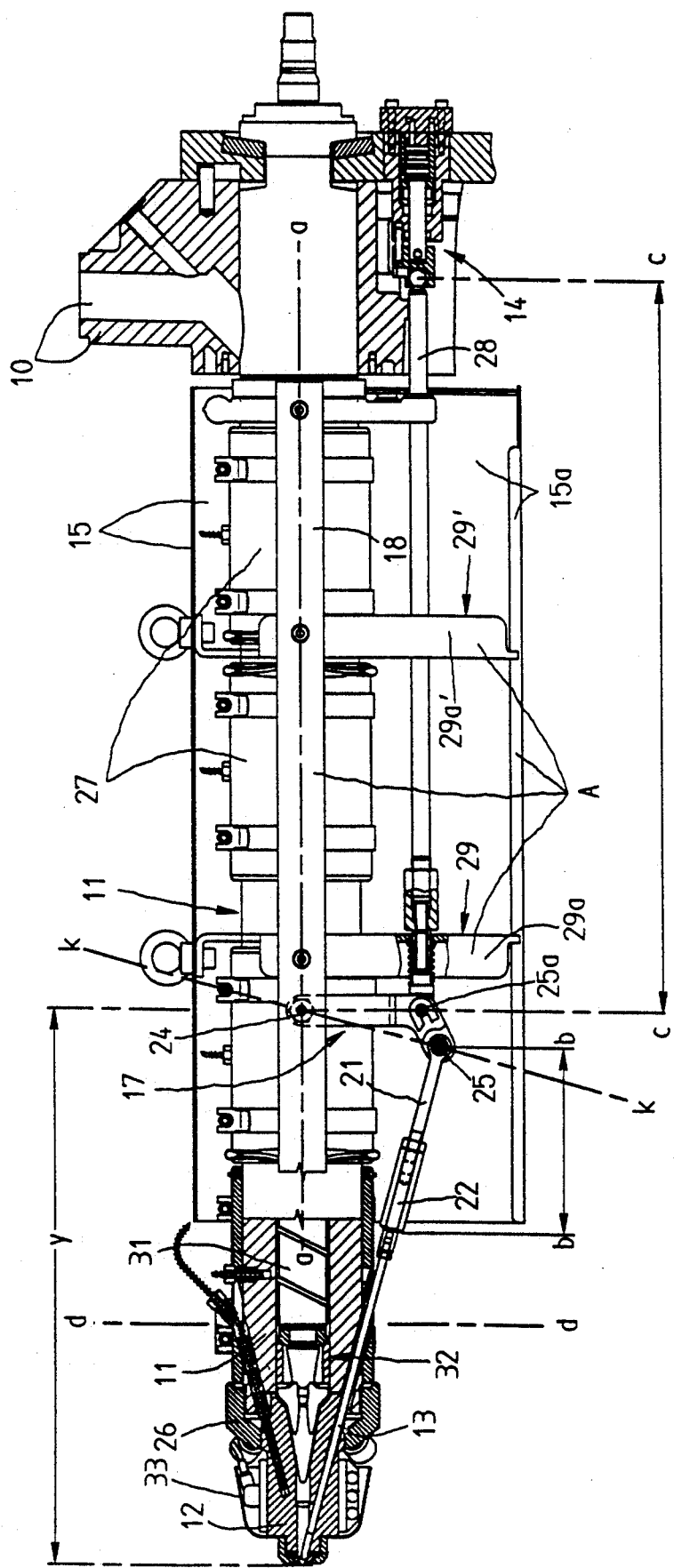
FIG. 1 is a side elevation showing partly in vertical section a plasticizing assembly in accordance with the invention.
Figure 2:
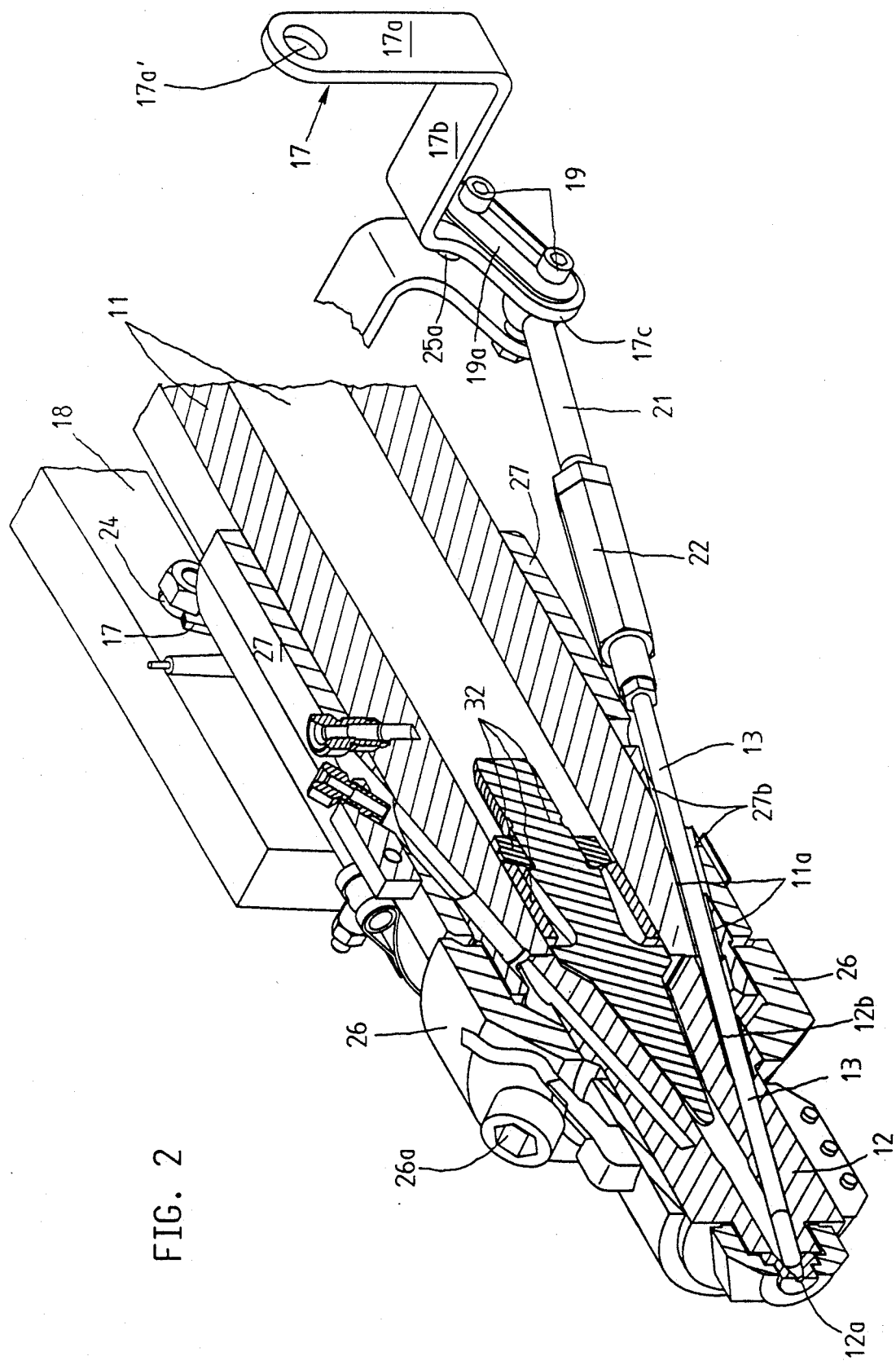
FIG. 2 is a perspective view showing the forward portion of the plasticizing assembly.
Figure 3:
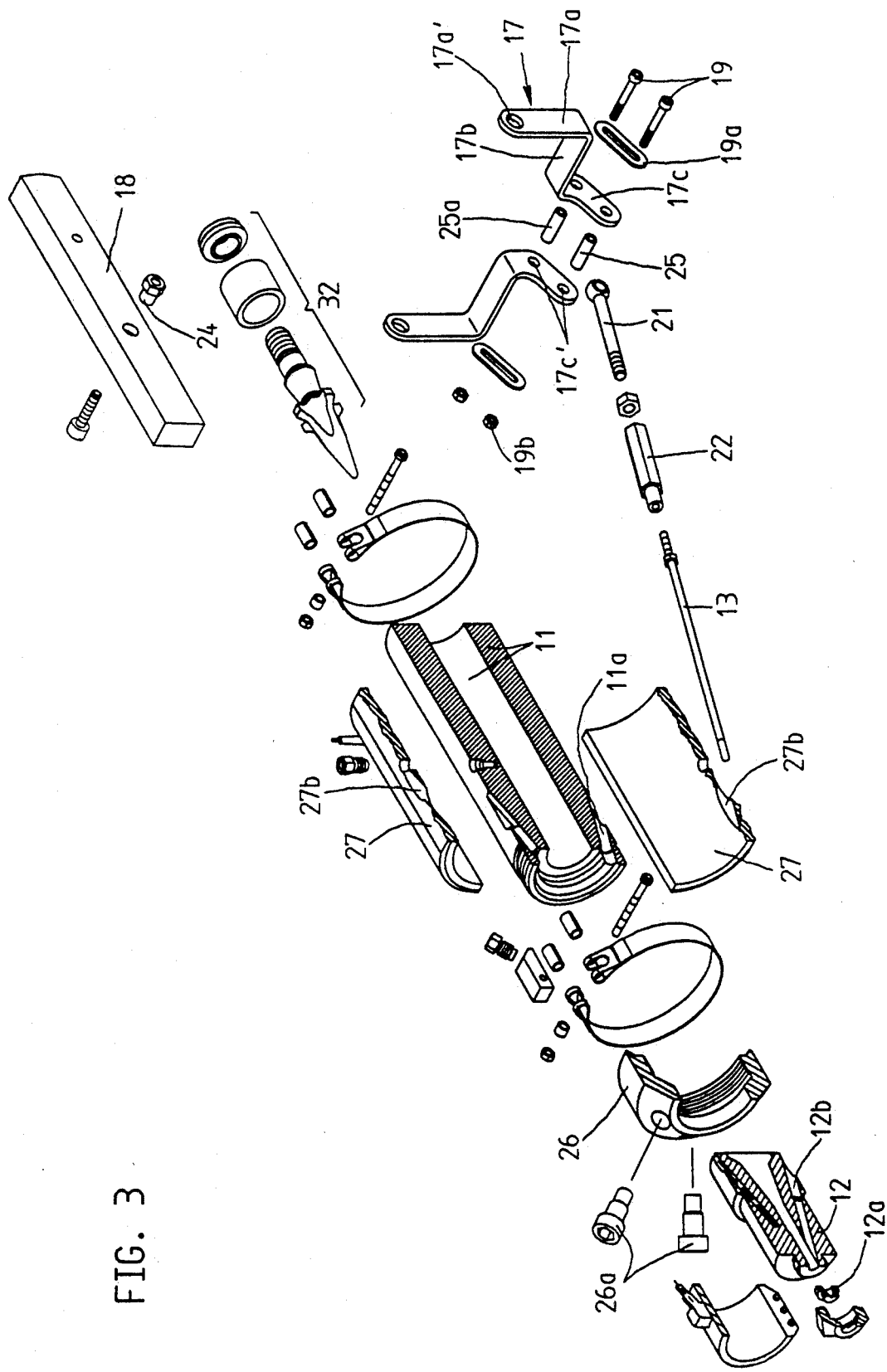
FIG. 3 is an exploded view showing on a smaller scale the forward portion of the plasticizing assembly.
Figure 4:
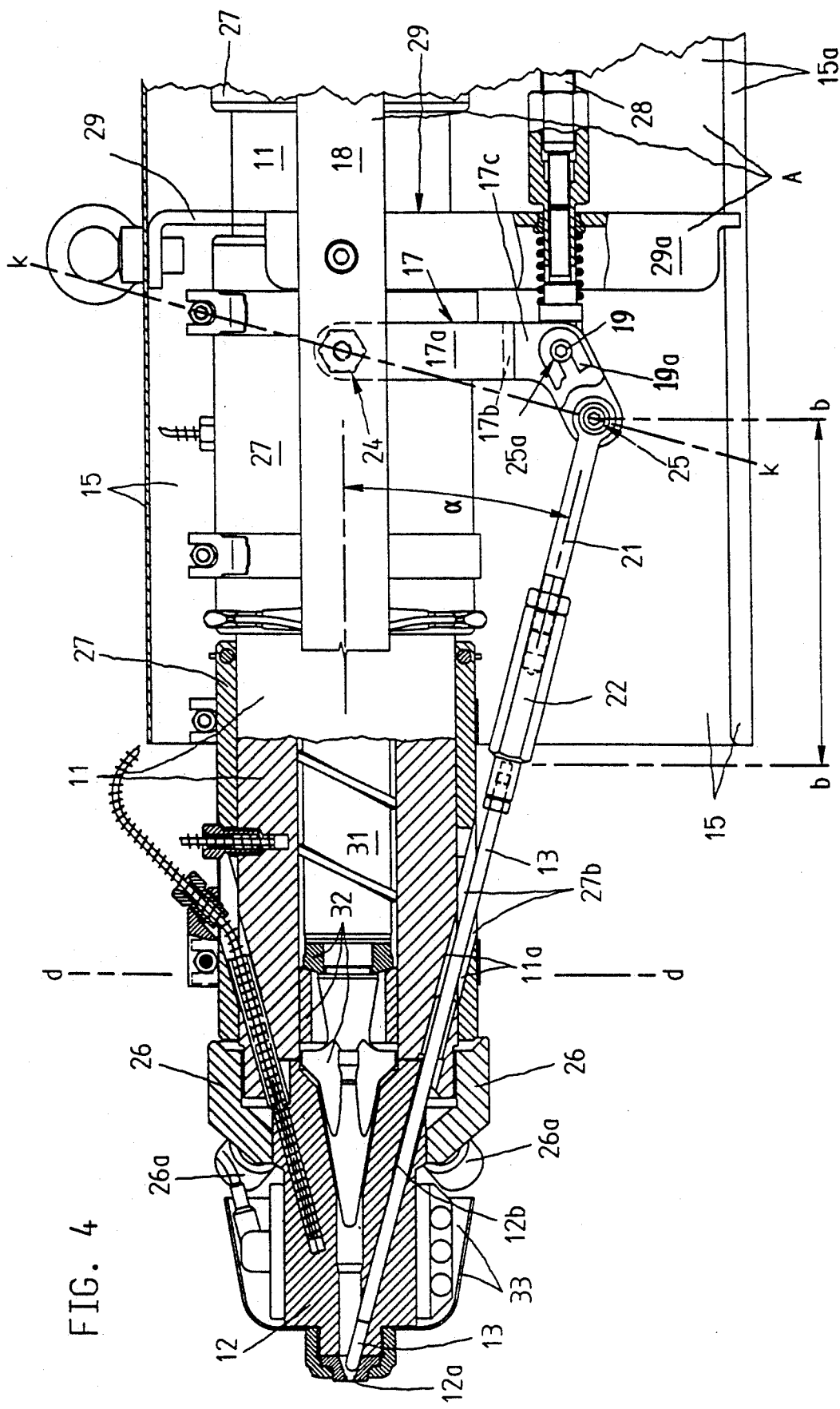
FIG. 4 is a fragmentary view showing a portion of FIG. 1 on a larger scale.
Figure 5:
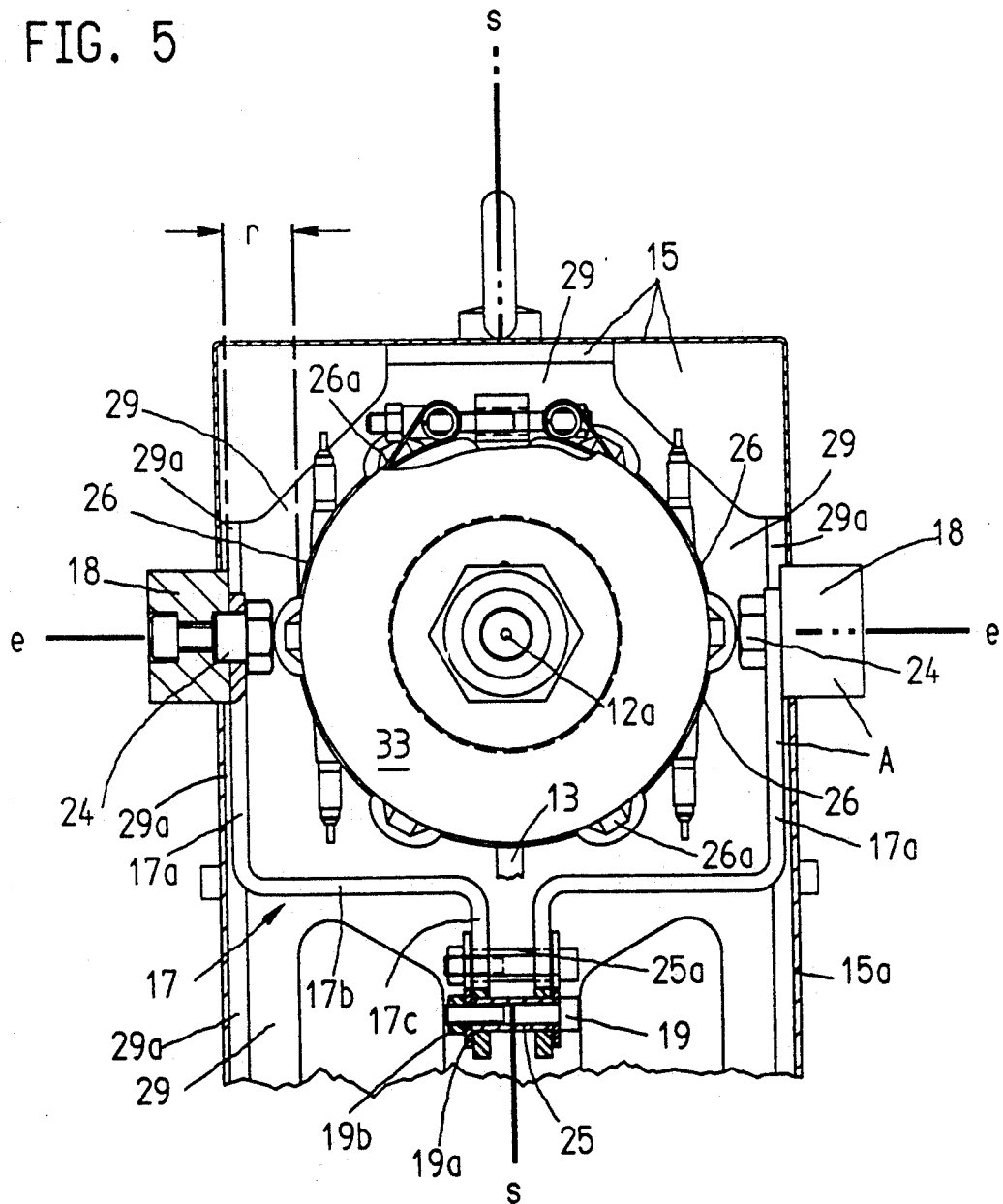
FIG. 5 is a front elevation showing partly in vertical section the plasticizing assembly comprising a protective skeleton.
Figure 6:
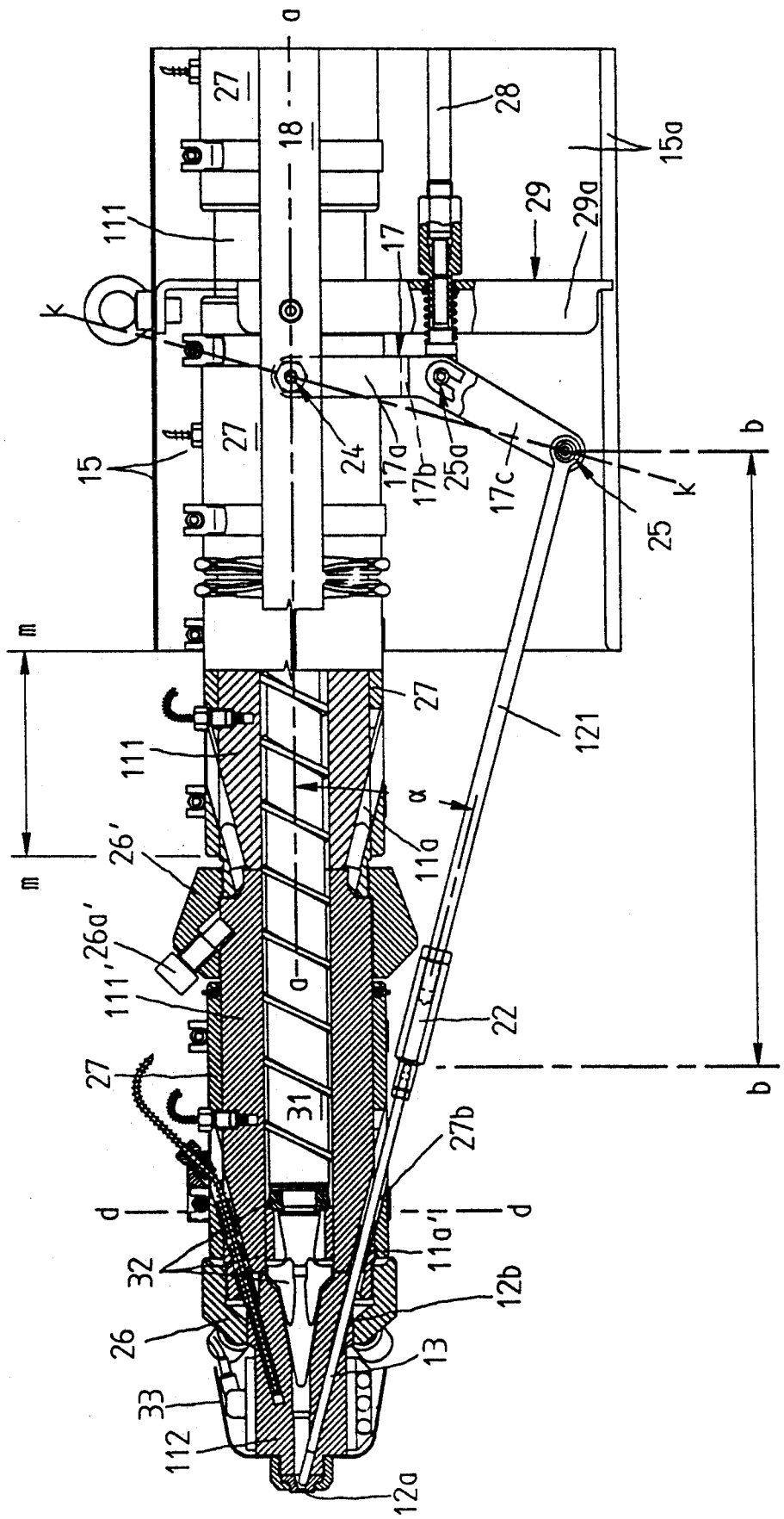
FIG. 6 is a view that is similar to FIG. 4 and illustrates a modification.
Figure 7:
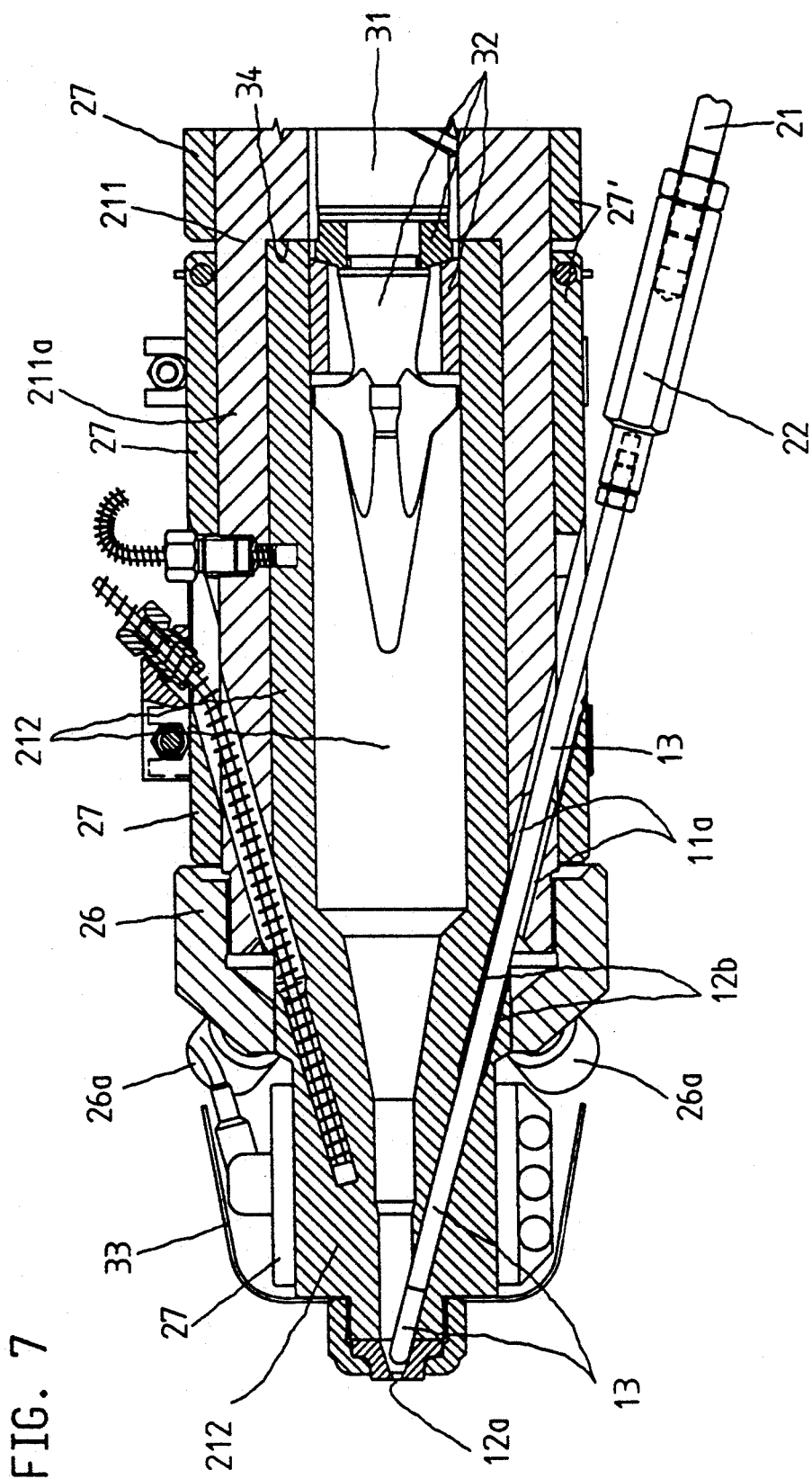
FIG. 7 is a fragmentary vertical sectional view showing a further embodiment of the plasticizing assembly.

The following features are common to the embodiment shown in FIGS. 1 to 5 and the modifications shown in FIGS. 6 and 7: The plasticizing cylinder comprises a nozzle section 12; 112; 212 provided with a shield 33 and a cylinder section 11; 111; 211. The nozzle section and the cylinder section are held together in axial alignment by clamping means which comprise a tapped clamping ring 26 and screws 26a. The internal screw threads of the clamping ring 26 are in threaded engagement with external screw threads on the cylinder section 11 or 111 or 211. The clamping ring 26 extends axially beyond the rear end of the nozzle section. The protruding portion of the clamping ring is formed with tapped bores, which contain screws 26a, which in the illustrated embodiment include an angle with the injection axis a—a. The edges at the free ends of the screws 26a bear on abutment surfaces of the nozzle section 12 or 112 or 212 so that the screws can be rotated to axially force the nozzle section and the cylinder section against one another. The plasticizing cylinder is intended for use in an injection molding machine and contains a feed screw 31, which is operable to rotate for feeding the plastic material being plasticized toward the nozzle section and to axially advance for injecting the plasticized plastic material. During the axial advance of the feed screw, a back flow valve 32 at the forward end of the feed screw 31 prevents a back flow of the plastic material. The rear portion of the plasticizing cylinder is detachably mounted in a carrier block 10. A skeleton is provided, which surrounds that length portion of the plasticizing cylinder which extends between the plane at which the back flow valve 32 is disposed in its foremost position and the carrier block 10. The skeleton comprises internal skeleton elements 29, track bars 18, an upper sheet metal shell section 15 and a lower sheet metal shell section 15a. They serve as supporting means and protect the plasticizing cylinder and the heating elements 27 associated with it against mechanical actions from the outside. The plasticizing cylinder is provided with a valve needle 13, which serves to open and close the nozzle orifice 12a and extends in the nozzle section 12; 112; 212 and in the cylinder section 11; 111; 211 in a bore, which extends at an angle of inclination α (FIGS. 4, 6) to the injection axis a—a. The valve needle 13 is operable by a hydraulic valve-actuating cylinder 14 (FIG. 1), which is provided adjacent to the carrier block 10. By means of a force-transmitting linkage, the strokes performed by the valve-actuating cylinder 14 in a direction which is parallel to the injection axis a—a are transformed to movements of the valve needle 13 at an inclination to the injection axis. A motion-deflecting lever 17 is pivoted by means of supporting pivots 24 to track bars 18 of the skeleton at a radial distance r from the heating elements 27 (FIG. 5). The linkage comprises the lever 17, a forward link b—b, which extends at an angle α to the injection axis a—a, and a rear link c—c, which is approximately parallel to the injection axis a—a, and said links are pivoted to the motion-deflecting lever 17 by pivots 25 and 25a, respectively. The motion-deflecting lever 17 is disposed within the skeleton and the supporting pivots 24 are mounted in track bars 18 of the skeleton. The valve needle 13 extends laterally of a length portion of the feed screw 31 when the latter is in its foremost position. At a location which is radially aligned with the back flow valve 32 the valve needle 13 extends of the needle-guiding bore, which has a relatively wide rear portion 12b, 11a. Stated differently, these portions have, as seen, for example, in FIG. 2, a diameter appreciably larger than the diameter of the valve 13, so that between bore and needle a clearance is defined which allows for a lateral excursion (bending) of the valve needle 13 in the bore. In the embodiments shown by way of example the valve needle 13 extends through the clamping ring 26 at an angle of inclination α which is less than 25°. The relatively wide rear portion 12b, 11a of the nozzle-guiding bore opens on the outside surface of the cylinder section 11; 111; 211 at a location which lies approximately in the sealing plane d—d of the back flow valve 32 when the feed screw 31 is in its foremost position. The heating elements 27 consist of cast shell sections, which are arranged in pairs to form axially adjoining heating cuffs, which consist of resistance heaters. The foremost heating cuff of the cylinder section 11, 111, 211 is formed with a passage 27b, which adjoins the rear end of the needle-guiding bore and through which the valve needle 13 extends. The passage 27b is constituted by recesses formed in the shell sections of the foremost heating cuff as they are cast.

The flat vertical skeleton elements 29, 29' are provided with flanges 29a, 29a', to which additional internal skeleton elements consisting of track bars 18 are secured, which lie in a horizontal plane e—e (FIG. 5), which extends through the injection axis a—a. The supporting pivots 24 for the motion-deflecting lever 17 are mounted on the inside of said bars 18. The supporting pivots 24 and the forward pivots 25 lie in a plane k—k, which is approximately at right angles to the forward link b—b of the force-transmitting linkage. The skeleton also comprises a protective shell, which surrounds the internal skeleton elements 29, 29' and comprises an upper sheet metal shell section 15 and a lower sheet metal shell section 15a. The two sheet metal shell sections 15 and 15a have longitudinal edges, which are contiguous to adjacent surfaces of the track bars 18. The forward link b—b of the force-transmitting linkage comprises a rod 21 and a tapped sleeve 22 by which the rod 21 is joined to the valve needle 13. The motion-deflecting lever 17 comprises two sections made from sheet metal blanks. Each of said sections has a vertical top portion 17a formed with a bearing bore 17a', a horizontal intermediate portion 17b and a forwardly inclined vertical bottom portion 17c formed with two bearing bores 17c', as is particularly apparent from FIG. 3. The rear link c—c of the rod 28 of the force-transmitting linkage is pivoted to the lever 17 by pivots 25a extending through bearing bores 17c' near the top end of each bottom portion 17c. The inclined forward link b—b of the linkage is pivoted to the lever 17 by forward pivots 25 extending through bearing bores 17' near the bottom end of each bottom portion 17c. The pivots 25, 25a are secured to the bottom portions 17c of the lever 17 by means of screws 19, washers 19a and nuts 19b. The screws 19 extend through the tubular pivot pins 25 and 25a.

In the modification illustrated in FIG. 6 the cylinder section comprises two sub-sections, namely, a rear cylindrical subsection 111 and a forward cylindrical subsection 111', which are axially aligned and held together by a clamping ring 26'and screws 26a which act like the clamping means 26, 26a of the embodiment shown in FIGS. 1 to 5. The parting line between the rear cylindrical subsection 111 and the forward cylindrical subsection 111' is axially spaced from the sheet metal shell sections 15, 15a by a distance m—m (FIG. 6), which equals the distance from the parting line between the nozzle section 12 and the cylinder section 11 to the protective shell in the embodiment shown in FIGS. 1 to 5. The forward link b—b of the rod 121 of the force-transmitting linkage and the feed screw 31 may be longer to the extent which is necessary because the length of the plasticizing cylinder has been increased by the provision of the forward cylindrical subsection 111'. In a practical embodiment of the kind shown in FIGS. 1 to 5, the distance y from the transverse vertical plane containing the supporting pivots 24 to the transverse vertical plane containing the nozzle orifice 12a is about one-third of the total length of the plasticizing cylinder. If the plasticizing cylinder comprises also the forward subsection 111' (FIG. 6), that distance will be increased by the length of the forward subsection 111'.

In the embodiment shown in FIG. 7 the cylinder section 211 comprises a forward portion 211a, which has a relatively large inside diameter and surrounds the rear portion of the nozzle section 212. The nozzle section 212 extends rearwardly to a plane in which the forward end of the feed screw 31 is disposed when it is in its rearmost position. As a result, the rear end face 34 of the nozzle section 212 regardless of the axial position of the feed screw is disposed on the rear of a space which will be subjected to an extremely high pressure during the injection of the plasticized plastic material into the mold.

I claim:

1. In a plasticizing assembly for use in an injection molding machine, the assembly including
    a plasticizing cylinder having a cylinder section and a nozzle section communicating with said cylinder section, said nozzle section having a nozzle orifice defining an injection axis, and clamping means for holding said cylinder and nozzle sections together in axial alignment,
    heating means for heating plastic material in said plasticizing cylinder,
    a feed screw having forward and rear ends and being rotatably and axially movably mounted in said plasticizing cylinder and being axially reciprocable therein between predetermined rearmost and foremost positions and being operable to feed plastic material,
    a back flow valve mounted on said feed screw at said forward end,
    a carrier block; a rear end of said cylinder section being detachably mounted in said carrier block,
    a skeleton surrounding said plasticizing cylinder and at least part of said heating means; said skeleton extending between a location radially aligned with said back flow valve when said feed screw is in said foremost position and a location radially aligned with a forward end of said carrier block, said skeleton including skeleton elements radially aligned with said heating means and serving to protect said plasticizing cylinder and said heating means and to support said plasticizing cylinder,
    a first needle-guiding bore formed in said nozzle section and being inclined relative to said injection axis and opening into said nozzle orifice,
    a valve needle longitudinally slidably mounted in said first needle-guiding bore and being operable to open and close said nozzle orifice,
    a valve-actuating cylinder adjacent to said carrier block and extending in a direction substantially parallel to said injection axis, and
    a force-transmitting linkage to transmit force from said valve-actuating cylinder to said valve needle to operate said valve needle; said force-transmitting linkage comprising a rear link longitudinally aligned with and longitudinally movable by said valve-actuating cylinder, a forward link longitudinally aligned with said valve needle and being inclined to said injection axis and being operable to longitudinally move said valve needle, and a motion-deflecting lever pivoted on a first axis by supporting pivot means radially aligned with said heating means and by additional pivot means being pivoted on at least one second axis spaced from said first axis to said rear and forward links, said lever being arranged to transform a movement along said injection axis imparted by said valve-actuating cylinder to said rear link into a longitudinal movement of said forward link and said valve needle,
    the improvement wherein
    said supporting pivot means are radially aligned with and radially outwardly spaced from said heating means with respect to said injection axis and are mounted on said skeleton elements,
    said motion-deflecting lever and said supporting pivot means are entirely disposed inside said skeleton,
    a second needle-guiding bore extends in said cylinder section as a continuation of said first needle-guiding bore; said second needle-guiding bore opening on an outside surface of said cylinder section at a location radially aligned with said back flow valve when said feed screw is in said foremost position; said valve needle having a length portion extending in said second needle-guiding bore; said second needle-guiding bore having a diameter larger than a diameter of said length portion for defining a radial clearance between a wall of said second needle-guiding bore and said valve needle; and
    said valve needle is stationarily connected to said forward link and extends out of said second needle-guiding bore to a location radially aligned with said feed screw when said feed screw is in said foremost position.

2. The plasticizing assembly set forth in claim 1, wherein
    said plasticizing cylinder has a parting line between said cylinder section and said nozzle section,
    said clamping means comprise a clamping ring surrounding said plasticizing cylinder, inclusive of said needle-guiding bores, adjacent to said parting line,
    said back flow valve defines a predetermined sealing plane when said feed screw is in its foremost position, and said relatively wide rear portion of said second needle-guiding bore opens on the outside surface of said cylinder section at a location which is disposed adjacent to said sealing plane.

3. The plasticizing assembly set forth in claim 1, wherein
said heating means comprise axially adjoining heating elements consisting of cast shell sections disposed behind said needle-guiding bores and having confronting surfaces formed with recesses defining a passage communicating with said second needle-guiding bore and
said valve needle extends through said passage.

4. The plasticizing assembly set forth in claim 1, wherein
said skeleton elements comprise flat skeleton elements formed with circular apertures, through which said cylinder section extends,
said flat skeleton elements are formed with flanges,
said skeleton further comprises skeleton elements including track bars secured to said flanges and extending in a horizontal plane which contains said injection axis,
said track bars have radially inwardly facing surfaces,
said supporting pivot means are mounted on said track bars on said radially inwardly facing surfaces,
said additional pivot means comprise forward pivot means pivotally connecting said forward link to said lever, and
said supporting pivot means and said forward pivot means lie in a plane which is substantially at right angles to said forward link.

5. The plasticizing assembly set forth in claim 1, wherein
said skeleton comprises a protective shell, which is secured to said skeleton elements and entirely surrounds said motion-deflecting lever and said forward link.

6. The plasticizing assembly set forth in claim 1, wherein
said skeleton elements comprise skeleton elements extending on opposite sides of said cylinder section, and
said motion-deflecting lever comprises two lever parts consisting of deformed sheet metal blanks and mounted by said supporting pivot means on said skeleton elements extending on opposite sides of said cylinder section.

7. The plasticizing assembly set forth in claim 1, wherein said forward link comprises a rod, which is pivoted by said additional pivot means to said motion-deflecting lever, and a tapped sleeve, by which said rod is detachably joined to said valve needle.

8. The plasticizing assembly set forth in claim 6, wherein
each of said lever parts comprises a vertical top portion having a first bearing bore, a horizontal intermediate portion, and a forwardly inclined vertical bottom portion formed with a second bearing bore near its upper end and with a third bearing bore adjacent to its lower end,
said supporting pivot means extend through said first bearing bores, and
said additional pivot means comprise first pivots extending through said second bearing bores and pivotally connecting said rear link to said lever and second pivots extending through said third bearing bores and pivotally connecting said forward link to said lever.

9. The plasticizing assembly set forth in claim 5, wherein
said cylinder section comprises a rear cylindrical subsection and a forward cylindrical subsection axially aligned and communicating with said rear subsection and said nozzle section and defining respective first and second parting lines therewith,
said clamping means detachably hold said subsections and said nozzle section together in axial alignment,
said protective shell has a forward end axially spaced behind said first parting line,
said second needle-guiding bore extends in and opens out on the outside surface of said forward subsection,
said valve needle has a rear end which is radially aligned with said forward subsection and connected to said forward link,
said forward end of said feed screw is arranged to be disposed at least partially in said forward subsection when said feed screw is in said foremost position,
said clamping means are adapted to hold said nozzle section and said rear subsection together in axial alignment when said forward subsection has been removed from said plasticizing assembly and
said rear subsection is formed with a bore which opens on the outside surface of said rear subsection and is adapted to constitute said rear portion of said bore when said nozzle section and said rear subsection are held together at said first parting line and said feed screw and said forward link have been replaced by shorter ones.

10. The plasticizing assembly set forth in claim 9, wherein said supporting pivot means are axially spaced from said nozzle orifice by the length of said forward subsection plus one-third of the total length of said nozzle section and said rear subsection.

11. The plasticizing assembly set forth in claim 1, wherein
said cylinder section is intergral and
said supporting pivot means are axially spaced from said nozzle orifice by about one-third of the total length of said plasticizing cylinder.

12. The plasticizing assembly set forth in claim 1, wherein
said cylinder section has a rear portion and a forward portion which is larger in inside diameter than said rear portion and surrounds said nozzle section, and
said feed screw has a forward portion arranged to extend into said forward portion of said cylinder section and into said nozzle section when said feed screw is in said rearmost position.

* * * * *